(12) United States Patent
Yao et al.

(10) Patent No.: US 11,136,776 B2
(45) Date of Patent: Oct. 5, 2021

(54) INTELLIGENT STORAGE CONTROL SYSTEM

(71) Applicant: BEIJING UNIVERSITY OF CIVIL ENGINEERING AND ARCHITECTURE, Beijing (CN)

(72) Inventors: Dechen Yao, Beijing (CN); Jianwei Yang, Beijing (CN); Tangbo Bai, Beijing (CN); Ziming Kou, Beijing (CN); Ran Sun, Beijing (CN); Chuan Liu, Beijing (CN); Fang Wen, Beijing (CN); Zhifen Pang, Beijing (CN)

(73) Assignee: BEIJING UNIVERSITY OF CIVIL ENGINEERING AND ARCHITECTURE, Beijing (CN)

( * ) Notice: Subject to any disclaimer, the term of this patent is extended or adjusted under 35 U.S.C. 154(b) by 0 days.

(21) Appl. No.: 16/493,293

(22) PCT Filed: Dec. 13, 2018

(86) PCT No.: PCT/CN2018/120773
§ 371 (c)(1),
(2) Date: Sep. 11, 2019

(87) PCT Pub. No.: WO2019/196471
PCT Pub. Date: Oct. 17, 2019

(65) Prior Publication Data
US 2021/0032889 A1    Feb. 4, 2021

(30) Foreign Application Priority Data
Apr. 8, 2018  (CN) .......................... 201810304859.X (51) Int. Cl.
*E04H 6/42*      (2006.01)
*E04H 6/00*      (2006.01)
(Continued)

(52) U.S. Cl.
CPC ............... *E04H 6/005* (2013.01); *B62H 3/00* (2013.01); *E04H 6/28* (2013.01); *E04H 6/424* (2013.01);
(Continued)

(58) Field of Classification Search
CPC ......... E04H 6/005; E04H 6/424; E04H 6/422; E04H 6/14; E04H 6/18; E04H 6/182;
(Continued)

(56) References Cited

U.S. PATENT DOCUMENTS 1,788,155 A * 1/1931 Geiger ...................... E04H 6/14
                                                            414/248
1,815,738 A * 7/1931 MacDonald .............. E04H 6/14
                                                            414/248
(Continued)

FOREIGN PATENT DOCUMENTS

CN       105804462 A  *  7/2016
CN       107401300 A  *  11/2017
(Continued)

*Primary Examiner* — Michael Safavi (57) ABSTRACT

An intelligent storage control system is provided in the present invention. The system includes a tower body, a delivery module, a drive module, a clamping module, an operation module, a control module, and a communication unit. When the control module receives a storage command transmitted by the operation module, the main controller is configured to analyze whether there is free storage space. If there is a free storage space, the control module controls the drive module to drive the delivery module to push the bicycle to the storage space of the tower body, and a serial number of the storage space is displaced on a display screen. The present invention can operate conveniently, and can save the footprint area of bicycles.

7 Claims, 9 Drawing Sheets

(51) Int. Cl.
*B62H 3/00* (2006.01)
*E04H 6/28* (2006.01)
*G05B 19/4155* (2006.01)

(52) U.S. Cl.
CPC .............. *G05B 19/4155* (2013.01); *G05B 2219/31275* (2013.01)

(58) Field of Classification Search
CPC .......... E04H 6/183; E04H 6/187; E04H 6/28; E04H 6/42; B62H 3/00
See application file for complete search history.

(56) References Cited

U.S. PATENT DOCUMENTS

| | | | | |
|---|---|---|---|---|
| 1,824,340 | A | * | 9/1931 | Geiger ................ E04H 6/14 414/592 |
| 2,874,822 | A | * | 2/1959 | Coursey ............. E04H 6/187 414/231 |
| 4,156,994 | A | * | 6/1979 | Steuer ................. E04H 6/005 312/202 |
| 9,073,591 | B2 | * | 7/2015 | Lee ..................... E04H 6/005 |
| 2017/0264065 | A1 | * | 9/2017 | Qi ....................... E04H 6/187 |
| 2019/0153739 | A1 | * | 5/2019 | Garcia, III ........... E04H 6/40 |
| 2020/0141147 | A1 | * | 5/2020 | Mingyan .......... G06Q 30/0284 |

FOREIGN PATENT DOCUMENTS

| | | | | |
|---|---|---|---|---|
| CN | 107448025 | A | * | 12/2017 |
| CN | 108316713 | A | * | 7/2018 |
| CN | 109025415 | A | * | 12/2018 |
| CN | 109441159 | A | * | 3/2019 |
| DE | 9111615 | U1 | * | 1/1993 ............ E04H 6/14 |
| DE | 4130994 | A1 | * | 3/1993 ............ E04H 6/14 |
| DE | 9308570 | U1 | * | 10/1994 .......... E04H 6/005 |
| DE | 102007002393 | A1 | * | 7/2008 ............ E04H 6/28 |
| DE | 202014105780 | U1 | * | 4/2015 ............ E04H 6/005 |
| DE | 202016101921 | U1 | * | 6/2016 ............ E04H 6/005 |
| GB | 270393 | A | * | 5/1927 ............ E04H 6/14 |
| WO | WO-2010150834 | A1 | * | 12/2010 .......... B62H 3/00 |
| WO | WO-2017023168 | A1 | * | 2/2017 ............ E04H 6/005 |
| WO | WO-2017091065 | A1 | * | 6/2017 ............ E04H 6/005 |
| WO | WO-2018212381 | A1 | * | 11/2018 .......... E04H 6/14 |
| WO | WO-2020242203 | A1 | * | 12/2020 | |

* cited by examiner

INTELLIGENT STORAGE CONTROL SYSTEM

BACKGROUND OF THE INVENTION

Field of the Invention

The present invention relates to an intelligent storage control system, which belongs to the technical field of intelligent control.

Description of Related Art

At present, the road resources of large cities are very valuable, and the space available on the ground is getting less and less. For example, the cost of parking on the ground in the city is more than double that of the underground garage or other three-dimensional parking mode, which directly reflects the current situation for the road.

SUMMARY OF THE INVENTION

The following is on overview of the subject matter described in detail herein, which is not intended to limit the scope of the claims.

In view of this, an intelligent storage control system is provided in the embodiment of the present invention. The specific technical solution of the intelligent storage control system is as follows. The system includes a tower body in a hollow cylinder shape, a center of the tower body being provided with a central garage including a plurality of storage spaces for storing bicycles. The system further includes: a delivery module, comprising a loop track disposed on an inner wall of the tower body and a ferry parking space movable in the loop track, the ferry parking space being capable of clamping a bicycle to stand; a drive module, comprising a first drive unit for driving the ferry parking space to move within the loop track, and a second drive unit for driving the ferry parking space to clamp the bicycle; a clamping module, comprising a first clamping unit disposed in the ferry parking space for clamping the bicycle, and a second clamping unit disposed in the storage space for clamping the bicycle; an operation module, configured to receive an operation command for storing and picking up the bicycle from a user, and generate a corresponding operation signal according to the operation command; a control module, configured to control movement of the drive module, the delivery module and the clamping module after receiving the operation signal transmitted by the operation module; and a communication unit, configured for signal transmission between the above modules.

Preferably, the ferry parking space includes a connection driving portion, the first drive unit including a drive motor and a gear disposed in the connection driving portion and a rack laid in the loop track for engagement with the gear.

Preferably, the ferry parking space further includes a bicycle clamping slot, an inner wall of the bicycle clamping slot is provided with a horizontal slot in a "+" shape with a section extends to an edge thereof, and a portion of the section of a moving rod inserted in the horizontal slot has a "T" shape; and the first clamping unit includes a moving rod disposed opposite to the inner wall of the bicycle clamping slot, a clamping arm connecting the moving rod, a limiting block fixedly disposed at one end of the moving rod, and a baffle disposed on a side of the horizontal slot facing an outer side of the bicycle clamping slot.

Preferably, the second drive unit includes a cylinder connecting the moving rod and the clamping arm, a gear disc disposed above or below the horizontal slot, a chain tightly sleeved on the gear disc, and a driver disposed at a corner of the inner wall of the bicycle clamping slot.

Preferably, the central garage has a cylindrical shape, and includes a central pillar. A plurality of layers of placement plates are arranged around the central pillar; a spacing between the adjacent upper and lower placement plates is greater than a height of the bicycle, and each layer of the placement plates is equally divided into a plurality of independent storage spaces by a longitudinal partitioning plate; and a longitudinal edge on one side of the longitudinal partitioning plate is fixed to the central pillar, and a longitudinal edge on the opposite side is aligned with an edge of the placement plate.

Preferably, the second clamping unit includes a movable clamping plate disposed in the storage space, and a telescopic rod connecting the movable clamping plate and the longitudinal partitioning plate.

Preferably, the control module includes a main controller disposed in the central pillar, and an on-off controller disposed in the drive motor and the driver; the main controller is wirelessly connected to each on-off controller via Bluetooth, and the main controller is capable of wirelessly controlling the on-off controller and recording whether there is a bicycle in each storage space. When the control module receives a storage command transmitted by the operation module, the main controller is configured to analyze whether there is free storage space. If there is a free storage space, the first drive unit drives the ferry parking space to climb to a storage parking point, and the bicycle is placed in the bicycle clamping slot by the user, and the first drive unit drives the ferry parking space to move to a designated free storage space after the second drive unit drives the first clamping unit to fix the bicycle while the second drive unit driving the first clamping unit to push the bicycle to the storage space, and the second drive unit drives the first clamping unit to retract into the ferry parking space while displaying a serial number of the storage space on a display screen after the second clamping unit clamps the bicycle.

BRIEF DESCRIPTION OF THE DRAWINGS

Aspects of the present invention are best understood from the following detailed description when read with the accompanying figures.

LIST OF SERIAL NUMBERS IN THE FIGURES

1 Tower body
2 Loop track

3 Ferry parking space
4 Placement plate
5 Central pillar
6 Channel
7 Apical plate
8 Clamping mechanism
9 Storage space
10 Connection driving portion
11 Bicycle clamping body
12 Clamping arm
13 Cylinder
14 Moving rod
15 Limiting block
16 horizontal slot
17 Gear disc
18 Motor
19 Chain
20 Clamping plate
21 Telescopic rod
22 Longitudinal partitioning plate

DESCRIPTION OF THE INVENTION

The technical solution in the embodiments of the present invention will be clearly and completely described hereafter in connection with drawings of specific embodiments of the present invention.

As shown in FIGS. 1 to 9, the system includes a tower body 1 in a hollow cylinder shape, a center of the tower body 1 being provided with a central garage including a plurality of storage spaces 9 for storing bicycles. The system further includes a delivery module including a loop track disposed on an inner wall of the tower body 1 and a ferry parking space 3 movable in the loop track 2, the ferry parking space 3 being capable of clamping a bicycle to stand; a drive module including a first drive unit for driving the ferry parking space 3 to move within the loop track 2, and a second drive unit for driving the ferry parking space 3 to clamp the bicycle; a clamping module including a first clamping unit disposed in the ferry parking space 3 for clamping the bicycle, and a second clamping unit disposed in the storage space for clamping the bicycle; an operation module configured to receive an operation command for storing and picking up the bicycle from a user, and generate a corresponding operation signal according to the operation command; a control module configured to control movement of the drive module, the delivery module and the clamping module after receiving the operation signal transmitted by the operation module; a communication unit configured for signal transmission between the above modules.

Figure 2:
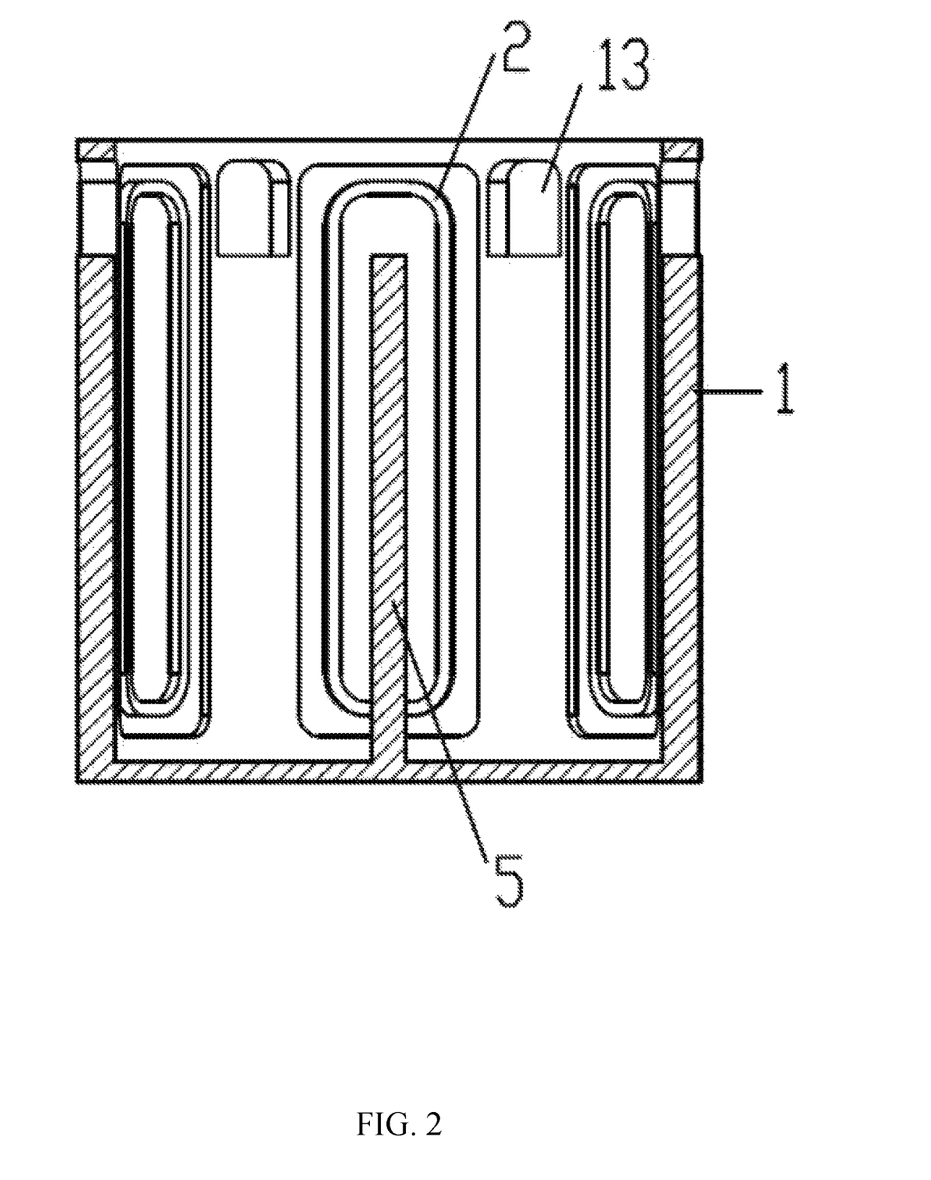
FIG. 2 is a sectional diagram of a warehouse structure of the present invention.
Figure 3:
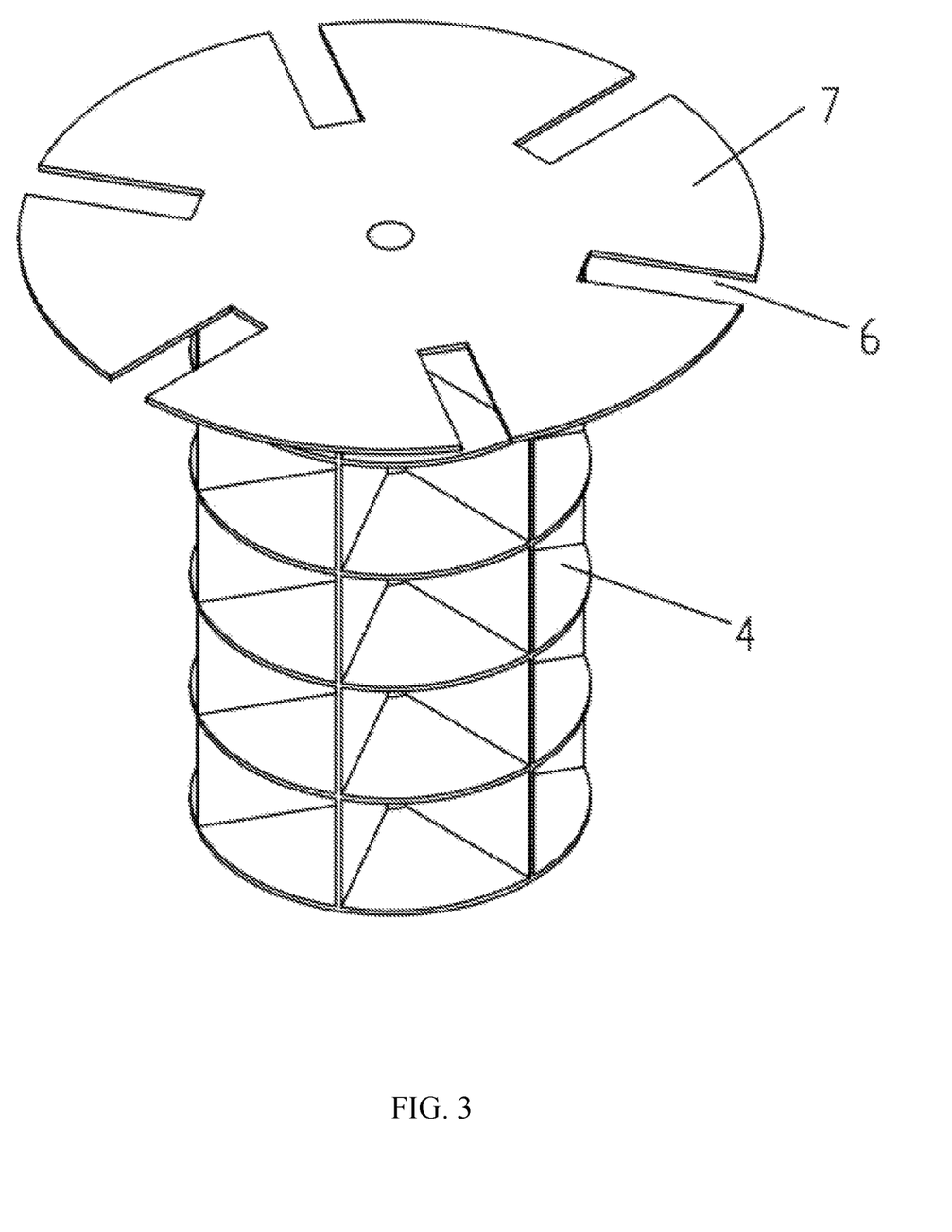
FIG. 3 is a structural diagram of a central garage of the present invention.
Figure 4:
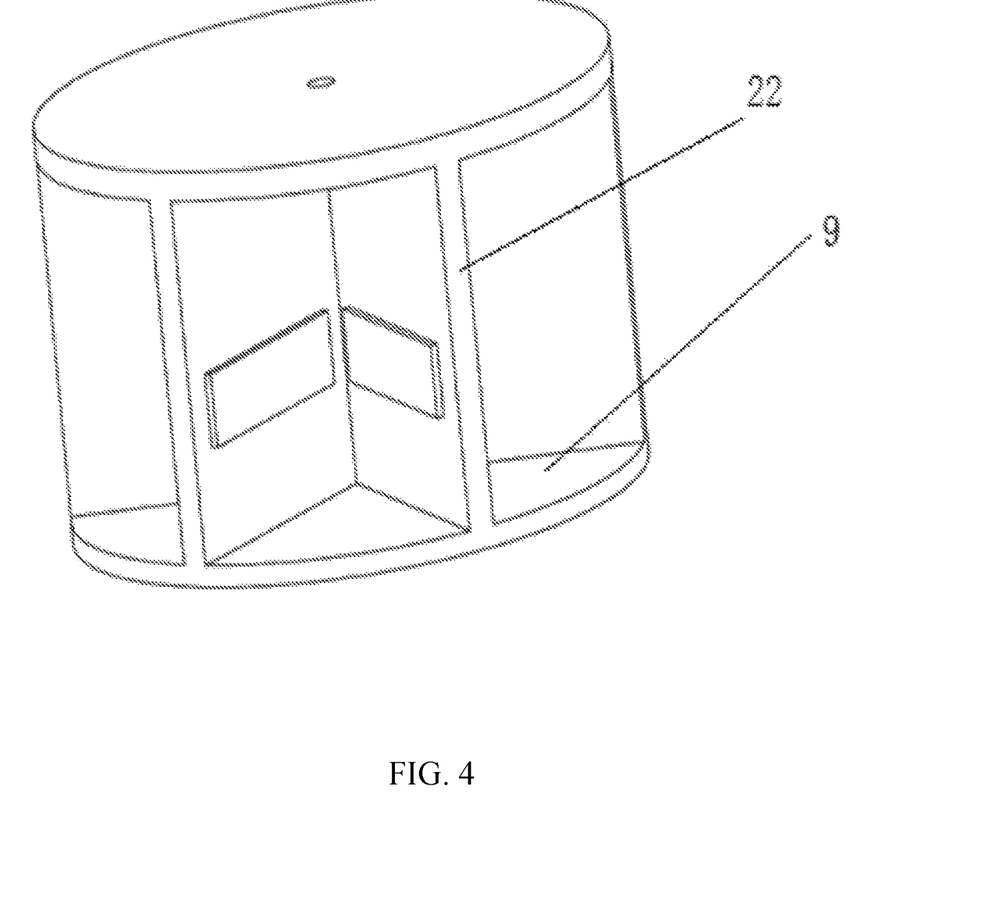
FIG. 4 is a structural diagram of a storage space of a central garage of the present invention.

The compartment includes a tower body 1 in a hollow cylinder shape, a center of the tower body 1 being provided with a central garage for storing bicycles, the central garage having a cylindrical shape including a central pillar 5; a plurality of layers of placement plates 4 are arranged around the central pillar 5; the spacing between the adjacent upper and lower placement plates 4 is greater than the height of a bicycle, and each layer of the placement plates 4 is equally divided into a plurality of independent storage spaces 9 by a longitudinal partitioning plate 22; a longitudinal edge on one side of the longitudinal partitioning plate 22 is fixed to the Central pillar 5, and a longitudinal edge on the opposite side is aligned with an edge of the placement plate 4; each storage space 9 is provided with a clamping mechanism 8 for clamping the bicycle.

Figure 9:
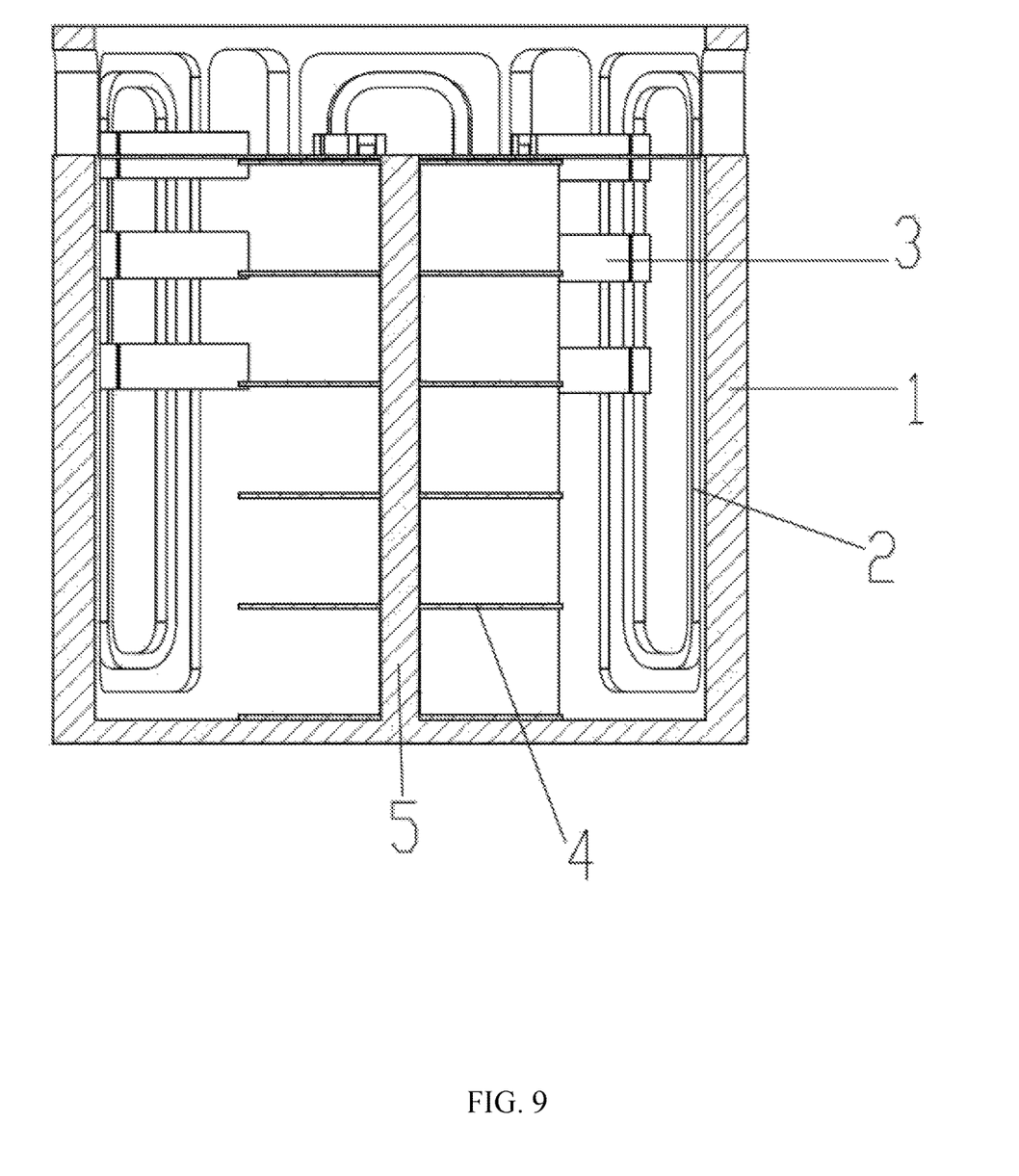
FIG. 9 is an overall longitudinal sectional view of the present invention.

An inner wall of the tower body 1 is longitudinally provided with a plurality of loop tracks 2, the loop tracks 2 including two longitudinal straight segments parallel to each other, and a top arc transition segment and a bottom arc transition segment circularly connecting the two longitudinal straight sections; each loop track 2 is provided with a plurality of ferry parking spaces 3 therein, the ferry parking spaces 3 being movable within the loop track 2, and the ferry parking spaces 3 are capable of clamping the bicycle in a standing position and capable of pushing the bicycle to the placement plate 4; and the bicycle is clamped into the clamping mechanism 8 within the storage space 9.

Figure 6:
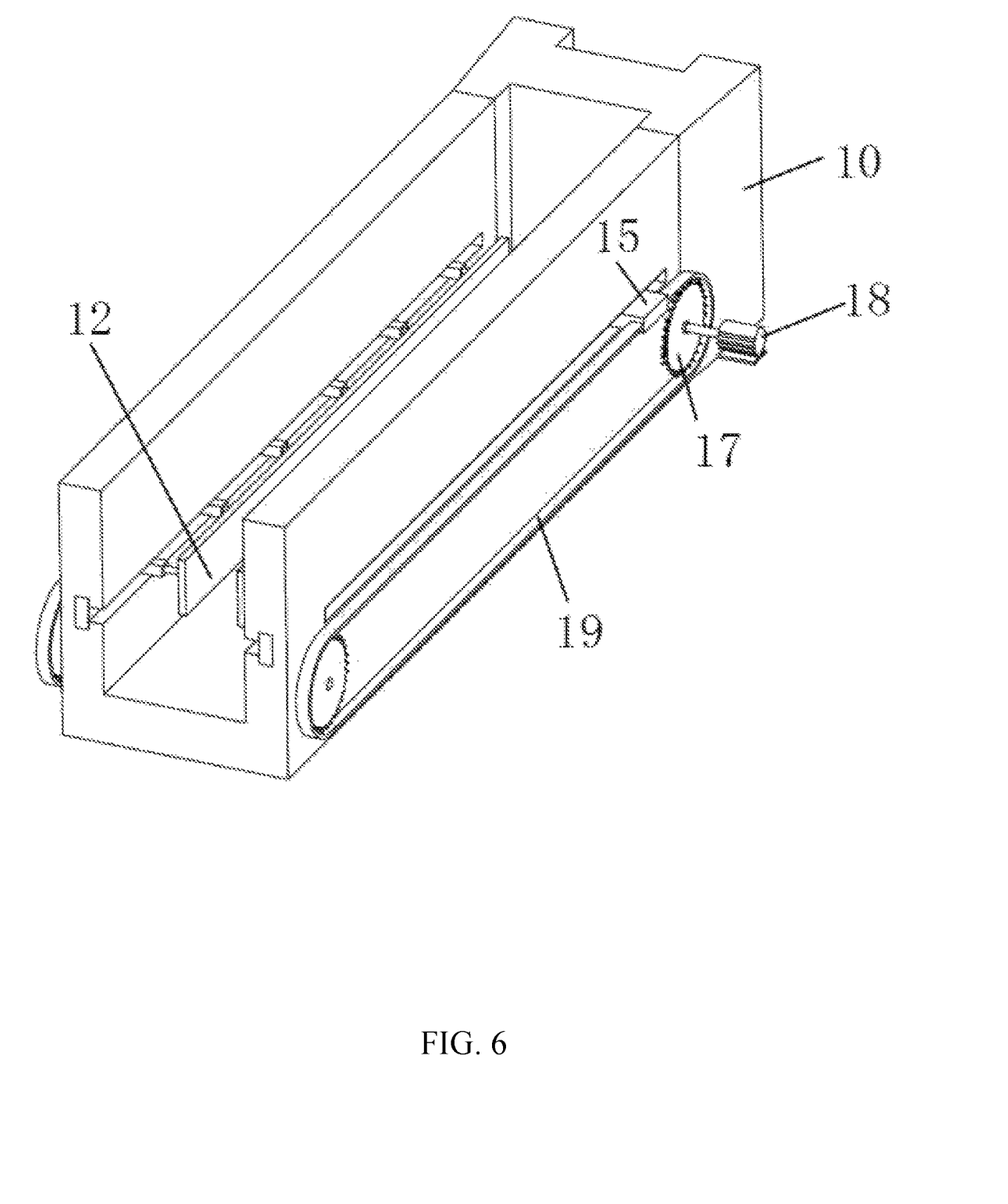
FIG. 6 is a structural diagram of a Ferry parking space of the present invention.

One longitudinal straight segment of the loop track 2 faces the storage space 9. The ferry parking space 3 includes a connection driving portion 10 and a bicycle clamping slot 11, the connection driving portion 10 being disposed in the loop track 2, side walls on both sides of the bicycle clamping slot 11 being connected to the connection driving portion 10 through a bearing; when the connection driving portion 10 passes the top arc transition segment and the bottom arc transition segment, the connection driving portion 10 is driven to advance in the loop track 2, the bicycle clamping slot 11 rotates around the bearing, and a side of the bicycle clamping slot 11 clamping the bicycle always faces upward.

Each connection driving portion 10 is provided with a drive motor that drives the connection driving portion 10 to move within the loop track 2.

A rack is laid in the loop track 2, and the connection driving portion 10 is provided with a gear meshing with the rack, so that the drive motor drives the gear to rotate, and the gear moves on the rack, to realize the movement of the bicycle clamping slot 11.

Figure 7:
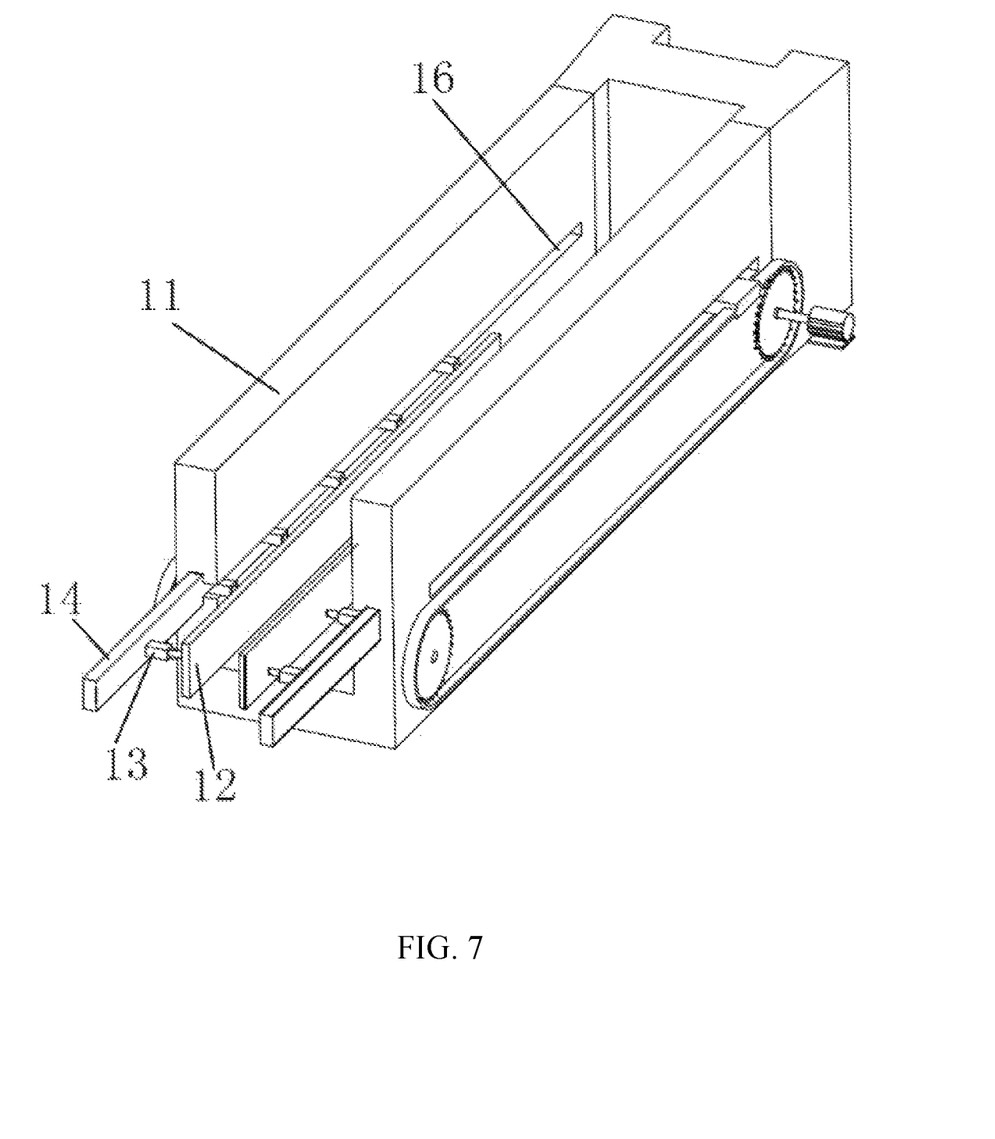
FIG. 7 is a diagram showing the status that a moving rod in FIG. 6 is extended.
Figure 8:
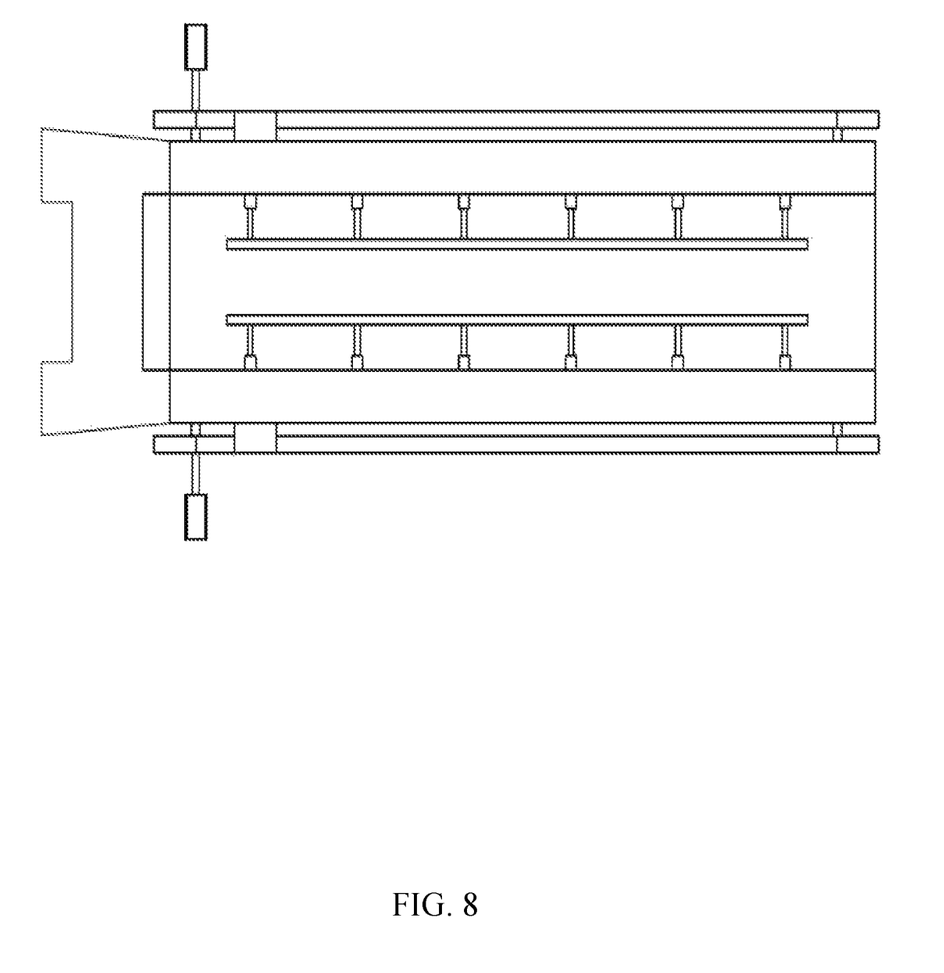
FIG. 8 is a top view of FIG. 6.

An inner wall of the bicycle clamping slot 11 is oppositely disposed with a moving rod 14, and the moving rod 14 may move on the inner wall of the bicycle clamping slot 11; the inner wall of the bicycle clamping slot 11 is provided with a horizontal slot 16 in a "+" shape with a section extends to the edge thereof, and the section of the moving rod 14 inserted in the horizontal slot 16 has a "T" shape.

One end of the moving rod 14 facing the central pillar 5 is fixedly provided with a limiting block 15, and the limiting block 15 is located at an opposite side of the moving rod 14 facing a horizontal slot 16 opening; the limiting block 15 cooperates with the clamping rod 12 to fill the section of the horizontal slot 16 of the "+" shape.

Two gear discs 17 are disposed above or below the horizontal slot 16, and the two gear discs 17 are respectively located on the horizontal sides of the horizontal slot 16; the two gear discs 17 are tightly sleeved with a chain 19, and the chain 19 passes through a channel of a horizontal slot 16 on the opposite side of the opening of the horizontal slot 16, and the limiting block 15 is fixed with the chain 19, one surface of the horizontal slot 16 facing an outer side of the bicycle clamping slot 11 is provided with a baffle, and the baffle only blocks the limiting block 15 to allow the chain 19 and the clamping rod 12 to pass. The gear disc 17 is driven by a driver disposed at a corner of the inner wall of the bicycle clamping slot 11.

The moving rod 14 is provided with a clamping arm 12 through a cylinder 13, and the clamping arm 12 is parallel to the moving rod 14; the cylinder 13 is perpendicular to the clamping arm 12, and is capable of pushing the clamping arm 12 toward the middle of the bicycle clamping slot 11. After the two clamping arms 12 move toward each other, the bicycle is clamped to stand from both sides of the bicycle; one of the clamping arms 12 is provided at both ends thereof with two parallel protective plates perpendicular to the clamping arm 12, which is used to prevent the bicycle from being detached from the clamping arms 12 during the movement process of moving the bicycle from the bicycle clamping slot 11 to the storage space 9, or moving the bicycle from the storage space 9 to the bicycle clamping slot 11.

Figure 5:
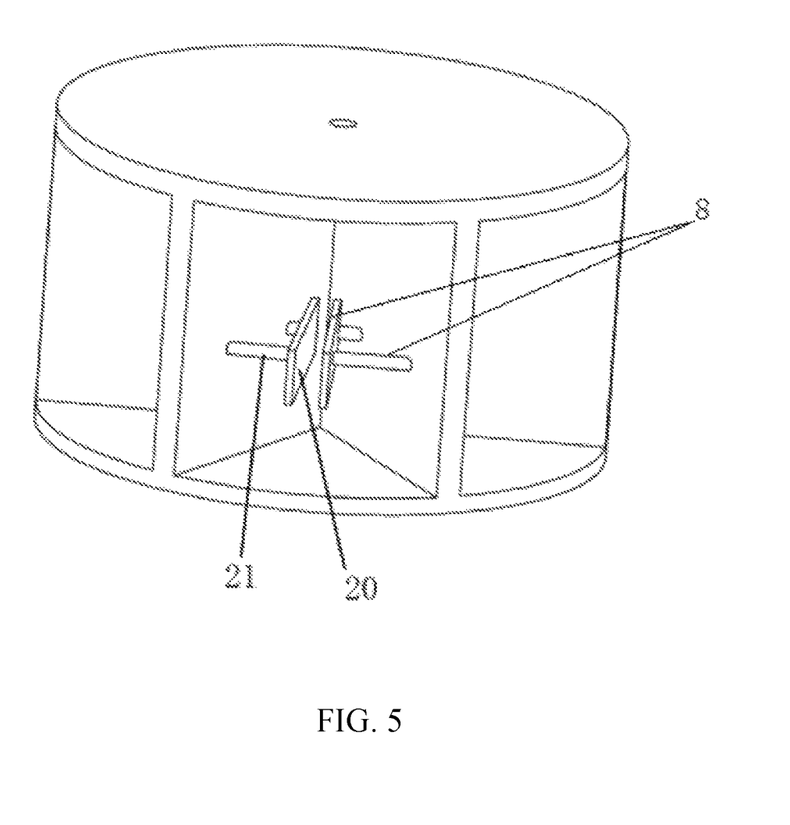
FIG. 5 is a diagram showing the status that a clamping plate in FIG. 4 is extended.

The clamping mechanism 8 includes a movable clamping plate 20 disposed on the opposite side of the longitudinal partitioning plate 22 in the storage space 9, and the clamping plate 20 is connected to the longitudinal partitioning plate 22 by at least two telescopic rods 21; the telescopic rod 21 may be horizontally extended to push the clamping plate 20 out, and the two clamping plates 20 are moved closer to each other to clamp the bicycle.

When the bicycle is transferred from the ferry parking space 3 to the storage space 9, the clamping plate 20 and the clamping arm 12 simultaneously clamp the bicycle, and the clamping plate 20 and the clamping arm 12 are staggered up and down without contact.

A top of the tower body 1 is provided with a top cover; the top arc transition of the loop track 2 is above the top level of the central garage, and the bottom arc transition of the loop track 2 is below the bottom level of the central garage.

The topmost apical plate 7 of the central garage extends toward the inner wall of the tower body 1 and is fixed to the inner wall of the tower body 1, and the apical plate 7 is provided with a channel 6 for passing the ferry parking space 3; the central pillar 5 extends from the center of the apical plate 7 and extends upward to contact the top cover; the central pillar 5 above the apical plate 7 is provided with a pickup button, a storage button, a numeric button and a display screen. Each storage space 9 is assigned a corresponding serial number, and the display screen is used to display the serial number of the storage space 9 where the parking is located.

A door allowing the passage of people and bicycles is provided around the tower body 1, and the door has the same height as the apical plate 7.

Figure 1:
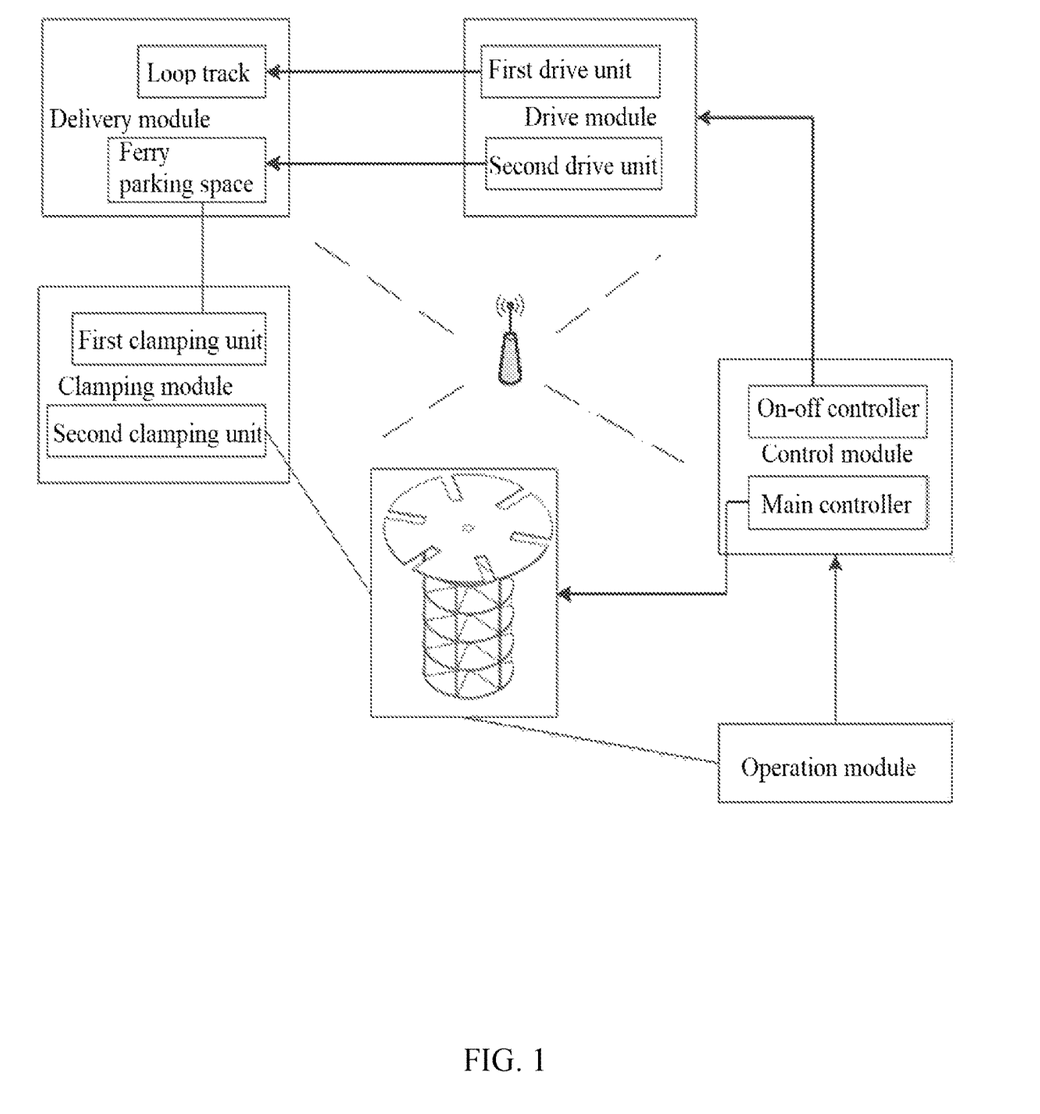
FIG. 1 is a system structural diagram of the present invention.

The present invention further includes a control module, the control unit including a main controller disposed in the central pillar 5 and an on-off controller disposed in each drive motor and the drive. The main controller is wirelessly connected to each on-off controller via Bluetooth, and the main controller is capable of wirelessly controlling each on-off controller and recording whether there is a bicycle in each storage space 9. When the control module receives a storage command transmitted by the operation module, the main controller analyzes whether there is free storage space. If there is a free storage space, the first drive unit drives the ferry parking space to climb to a storage parking point, and the bicycle is placed in the bicycle clamping slot by a user. The first drive unit drives the ferry parking space to move to a designated free storage space after the second drive unit drives the first clamping unit to fix the bicycle while the second drive unit driving the first clamping unit to push the bicycle to the storage space, and the second drive unit drives the first clamping unit to retract into the ferry parking space while displaying the serial number of the storage space on a display screen after the second clamping unit clamps the bicycle.

When the main controller does not receive any command, the ferry parking space 3 on each loop track 2 is sequentially arranged on one side of the loop track 2.

When someone clicks the storage button, the main controller receives a parking command and analyzes whether there is free storage space 9, then drives one ferry parking space 3 to climb to the apical plate 7 in order from top to bottom if there is storage space 9. Subsequently, the user places the bicycle in the bicycle clamping slot 11, and clicks the storage button again after the bicycle is fixed, so that the main controller drives the ferry parking space 3 to move to a nearby free storage space 9 and displays a serial number of the storage space 9 on the display screen, which is remembered by the user.

When the pickup button is clicked, the main controller receives a pickup command, and the display and the numeric button are activated; the serial number of the storage space 9 is input to the main controller by clicking the numeric button, the serial number is displayed on the display, and the main controller drives the corresponding ferry parking space 3 to take the bicycle on the storage space 9.

The bicycle storing method of the intelligent storage compartment is as follows:

When it is necessary to park the bicycle, first, the bicycle is brought to the apical plate 7, and then, by clicking the storage button, the three-dimensional rotating intelligent storage compartment starts to initiate; determining whether the storage space 9 is free: the control unit receives a parking demand on the apical plate 7, and finds whether there is a free storage space 9. If not, "the parking space is full" is displayed on the display screen, and if so, a free storage space 9 is selected while displaying the serial number of the storage space 9 on the display screen.

The uppermost one of the ferry parking spaces 3 in the corresponding loop track 2 of the storage space 9 is initiated, and the control unit initiates the drive motor of the ferry parking space 3 to drive the gear of the ferry parking space 3 to rotate and crawl on the rack until the ferry parking space 3 runs above the apical plate 7 and bypasses the top arc transition segment of the loop track 2 for being flush with the apical plate 7 and stopping.

Each loop track 2 passes through the apical plate 7 twice. The apical plate 7 is provided with two channels 6 for passing the ferry parking space 3, wherein the track in one of the channels 6 is located directly in front of the storage space 9, and the channel 6 is provided with a sensor. When the ferry parking space 3 is located in the channel 6, the drive motor of the ferry parking space 3 is stopped to be parked in the channel 6, and the longitudinal straight segment of the loop track 2 corresponding to the other channel 6 is a standby waiting stop of the ferry parking space 3. When the ferry parking spaces 3 on the loop track 2 are on standby, they are sequentially stopped in the longitudinal straight segment. When there is a storage command, all the ferry parking spaces are either clockwise or counterclockwise running on the loop track 2. When a topmost ferry parking space starts to work, all other standby ferry parking spaces move up to the corresponding height of the parking space, and are sequentially placed below the ferry parking spaces in waiting after the worked ferry parking space completes the work.

The user stands outside the stable ferry parking space 3 and holds the bicycle to stand, then clicks the storage button to initiate the clamp arm 12; the clamping arm 12 moves close to each other until the bicycle is clamped, and when the user releases the hand, the bicycle may stand on its own in the bicycle placing slot.

When the drive motor works, the ferry parking space 3 moves down to a designated storage space 9; then the drive works, the moving rod 14 moves out to feed the bicycle into the storage space 9, and the clamping rod 12 senses the bicycle, initiates; the clamping rod 12 moves toward each other to clamp the bicycle, and when the clamp arm 12 is retracted, the moving rod 14 is also moved back into the bicycle clamping slot 11.

The side walls on both sides of the storage space 9 are provided with a sensor, which may sense that a bicycle is moved to the storage space 9. When the sensor senses that there is a bicycle, the controller of the clamping rod 12 is actuated to move the clamping rods 12 toward each other until the two clamping rods 12 clamp and fix the bicycle from both sides.

The side surface of the clamping arm 12 facing the clamping rod 12 is provided with a sensor whose sensing section is a vertically upward or vertical downward area. When the sensor senses the clamping rod 12, indicating that the clamping rod 12 has clamped the bicycle, the sensor activates the clamping arm 12 to retract, and the moving rod 14 to retract.

After the clamping arm 12 is attached to the moving rod 14 and the moving rod 14 is completely retracted into the bicycle clamping slot 11, the ferry parking space 3 is arranged in sequence clockwise or counterclockwise in sequence below the other ferry parking spaces 3, and are parked in the longitudinal straight segment of the loop track 2 on the standby side.

The bicycle pickup methods are as follows:

When the pickup button is clicked, the serial number of the storage space 9 parked by the bicycle is input on the display screen, and the control system activates the lowest ferry parking space 3 in the loop track 2 corresponding to the storage space 9; then, the running direction of the ferry parking space 3 is opposite to that when the bicycle is stored, the ferry parking space 3 is moved to the corresponding storage space 9, and the moving rod 14 extends into the storage space 9; and when the moving rod 14 protrudes until the limiting block 15 abuts against the baffle, the moving rod 14 stops moving to activate the clamping arm 12, and the clamping arm 12 moves toward each other until the sensor on the clamping arm 12 senses the clamping plate to retract the clamping plate and to activate the moving rod 14 to retract. Subsequently, when the moving rod 14 is completely retracted into the bicycle clamping slot 11, the ferry parking space 3 is activated to rise until it is flush with the apical plate 7 for parking. After parking to be stable, the clamping arm 12 is retracted, and the user takes the bicycle away and clicks the pickup button again so that the ferry parking space 3 is activated to bypass the top arc segment of the loop track 2 and descend to the standby waiting point of the ferry parking space 3.

Both ends of the limiting block 15 are provided with a contact sensor. When the moving rod 14 stops moving forward, the contact sensor contacts the baffle while the moving rod 14 stopping moving. When the moving rod 14 is retracted into the bicycle parking slot, the moving rod 14 stops moving as the contact sensor contacts the inner wall of the horizontal slot 16.

In the present invention, the bicycle is placed in the storage space 9, and the bicycle stands by the clamping mechanism 8, so that when the bicycle is being picked up, the ferry parking space 3 is configured to pick up the bicycle.

The ferry parking space 3 moves in the loop track 2, so that the bicycle may be picked up and stored. There is multiple ferry parking spaces 3 in one loop track 2. When the tower body 1 is high and the number of storage spaces 9 is huge, a plurality of ferry parking spaces 3 work at the same time, shortening the waiting time of the user, and improving the efficiency of storing and picking up the bicycle.

The two longitudinal straight segments are connected by the top arc transition section and the bottom arc transition section to form a complete circuit, so that the ferry parking space 3 may be periodically moved on the loop track 2 to prevent mutual collision and contact. The provision of the bearings ensures that the opening of the bicycle clamping slot 11 is always oriented by the weight of the bicycle clamping slot 11. When the connection driving portion 10 is moved to the top arc transition segment and the bottom arc transitional segment, the bicycle clamping slot 11 rotates around the bearing under its own weight, and the opening is always oriented.

The gear moves on the rack to move the bicycle clamping slot 11. Each drive motor works independently. The technical means disclosed in the solution of the present invention is not limited to the technical means disclosed by the above technical means, and includes a technical solution composed of any combination of the above technical features.

In view of the above-described ideal embodiments of the present invention, through above description, various changes and modifications may be made by those skilled in the art without departing from the scope of the invention. The technical scope of the present invention is not limited to the contents of the specification, and the technical scope thereof must be determined according to the scope of the claims.

INDUSTRIAL APPLICABILITY

In the present invention, sensors are provided in multiple places, are used to activate or stop the corresponding activities, and there is a linkage or feedback relationship between them to realize automatic interlocking action, so that in the underground with unmanned control, the operation of storing and picking up the bicycle is executed in succession to achieve automatic control.

In the present invention, parking the bicycle into the three-dimensional bicycle tower can save the standing space, may realize automatic storage and pickup, which is convenient to operate and saves time.

What is claimed is:

1. An intelligent storage control system, comprising a tower body in a hollow cylinder shape, a center of the tower body being provided with a central garage including a plurality of storage spaces for storing bicycles, characterized in that the system further comprises:
    a delivery module, comprising a loop track disposed on an inner wall of the tower body and a ferry parking space movable in the loop track, the ferry parking space being capable of clamping a bicycle to stand;
    a drive module, comprising a first drive unit for driving the ferry parking space to move within the loop track, and a second drive unit for driving the ferry parking space to clamp the bicycle;
    a clamping module, comprising a first clamping unit disposed in the ferry parking space for clamping the bicycle, and a second clamping unit disposed in the storage space for clamping the bicycle;
    an operation module, configured to receive an operation command for storing and picking up the bicycle from a user, and generate a corresponding operation signal according to the operation command;
    a control module, configured to control movement of the drive module, the delivery module and the clamping module after receiving the operation signal transmitted by the operation module; and
    a communication unit, configured for signal transmission between the above modules.

2. The intelligent storage control system according to claim 1, wherein:
the ferry parking space comprises a connection driving portion, the first drive unit comprising a drive motor and a gear disposed in the connection driving portion and a rack laid in the loop track for engagement with the gear.

3. The intelligent storage control system according to claim 2, wherein:
the ferry parking space further comprises a bicycle clamping slot, an inner wall of the bicycle clamping slot is provided with a horizontal slot in a "+" shape with a section extends to an edge thereof, and a portion of the section of a moving rod inserted in the horizontal slot has a "T" shape; and
the first clamping unit comprises a moving rod disposed opposite to the inner wall of the bicycle clamping slot, a clamping arm connecting the moving rod, a limiting block fixedly disposed at one end of the moving rod, and a baffle disposed on a side of the horizontal slot facing the outside of the bicycle clamping slot.

4. The intelligent storage control system according to claim 3, wherein:
the second drive unit comprising a cylinder connecting the moving rod and the clamping arm, a gear disc disposed above or below the horizontal slot, a chain tightly sleeved on the gear disc, and a driver disposed at a corner of the inner wall of the bicycle clamping slot.

5. The intelligent storage control system according to claim 4, wherein:
the central garage has a cylindrical shape, and comprises a central pillar; a plurality of layers of placement plates are arranged around the central pillar; a spacing between the adjacent upper and lower placement plates is greater than a height of the bicycle, and each layer of the placement plates is equally divided into a plurality of independent storage spaces by a longitudinal partitioning plate; and a longitudinal edge on one side of the longitudinal partitioning plate is fixed to the central pillar, and a longitudinal edge on the opposite side is aligned with an edge of the placement plate.

6. The intelligent storage control system according to claim 5, wherein:
the second clamping unit comprises a movable clamping plate disposed in the storage space, and a telescopic rod connecting the movable clamping plate and the longitudinal partitioning plate.

7. The intelligent storage control system according to claim 6, wherein:
the control module comprises a main controller disposed in the central pillar, and an on-off controller disposed in the drive motor and the driver; the main controller is wirelessly connected to each on-off controller via Bluetooth, and the main controller is capable of wirelessly controlling the on-off controller and recording whether there is a bicycle in each storage space;
when the control module receives a storage command transmitted by the operation module, the main controller is configured to analyze whether there is free storage space; if there is a free storage space, the first drive unit drives the ferry parking space to climb to a storage parking point, and the bicycle is placed in the bicycle clamping slot by the user, and the first drive unit drives the ferry parking space to move to a designated free storage space after the second drive unit drives the first clamping unit to fix the bicycle while the second drive unit driving the first clamping unit to push the bicycle to the storage space, and the second drive unit drives the first clamping unit to retract into the ferry parking space while displaying a serial number of the storage space on a display screen after the second clamping unit clamps the bicycle.

* * * * *